US008895111B2

(12) United States Patent
Poruthoor et al.

(10) Patent No.: US 8,895,111 B2
(45) Date of Patent: Nov. 25, 2014

(54) SUBSTRATES HAVING IMPROVED INK ADHESION AND OIL CROCKFASTNESS (75) Inventors: Simon Poruthoor, Alpharetta, GA (US); Lisa Sanabria, Alpharetta, GA (US); Ali Yahiaoui, Roswell, GA (US); Kelly Branham, Woodstock, GA (US); Hue Scott Snowden, Canton, GA (US); Olesya Sukhareva, Decatur, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 1582 days.

(21) Appl. No.: 11/724,054

(22) Filed: Mar. 14, 2007

(65) Prior Publication Data
US 2008/0227356 A1 Sep. 18, 2008

(51) Int. Cl.
*B05D 1/32* (2006.01)
*D06P 1/00* (2006.01)
*C09D 11/03* (2014.01)
*C09D 11/38* (2014.01)
*D06P 1/44* (2006.01)
*D06P 1/54* (2006.01)
*D06P 1/642* (2006.01)

(52) U.S. Cl.
CPC .............. *D06P 1/0064* (2013.01); *C09D 11/03* (2013.01); *C09D 11/38* (2013.01); *D06P 1/0072* (2013.01); *D06P 1/44* (2013.01); *D06P 1/54* (2013.01); *D06P 1/6426* (2013.01)
USPC ........................................................ 427/466

(58) Field of Classification Search
None
See application file for complete search history.

(56) References Cited

U.S. PATENT DOCUMENTS

| 3,338,992 A | 8/1967 | Kinney |
| 3,341,394 A | 9/1967 | Kinney |
| 3,502,538 A | 3/1970 | Petersen |
| 3,502,763 A | 3/1970 | Hartman |
| 3,542,615 A | 11/1970 | Dobo et al. |
| 3,692,618 A | 9/1972 | Dorschner et al. |
| 3,802,817 A | 4/1974 | Matsuki et al. |
| 3,849,241 A | 11/1974 | Butin et al. |
| 3,901,236 A | 8/1975 | Assarsson et al. |
| 4,076,663 A | 2/1978 | Masuda et al. |

(Continued)

FOREIGN PATENT DOCUMENTS

| EP | 0687325 B1 | 7/1996 |
| GB | 1325615 A | 8/1973 |

(Continued)

OTHER PUBLICATIONS

PCT International Search Report and Written Opinion for Application No. PCT/IB2008/050281, completed Jun. 17, 2008, mailed Jun. 24, 2008.

*Primary Examiner* — Michael Cleveland
*Assistant Examiner* — Joel Horning
(74) *Attorney, Agent, or Firm* — Dority & Manning, P.A.

(57) ABSTRACT

A printed nonwoven web having improved oil crockfastness when an ink composition is applied to an outer surface of the nonwoven is generally disclosed. For example, an ink composition that has improved resistance to rub off of the web, even if the ink composition contacts an oily substance (e.g., baby oil, lotion, etc.), can be printed on a surface of the web. The nonwoven web can be a layer in a laminate having at least a film layer and the nonwoven web layer. For example, the printed laminate can be used as the outercover of an absorbent article.

17 Claims, 1 Drawing Sheet (56) References Cited

U.S. PATENT DOCUMENTS

| | | | |
|---|---|---|---|
| 4,100,324 A | 7/1978 | Anderson et al. | |
| 4,286,082 A | 8/1981 | Tsubakimoto et al. | |
| 4,323,534 A | 4/1982 | DesMarais | |
| 4,340,563 A | 7/1982 | Appel et al. | |
| 4,341,216 A | 7/1982 | Obenour | |
| 4,663,220 A | 5/1987 | Wisenski et al. | |
| 4,758,239 A | 7/1988 | Yeo et al. | |
| 4,795,668 A | 1/1989 | Krueger et al. | |
| 4,818,600 A | 4/1989 | Braun et al. | |
| 4,834,738 A | 5/1989 | Kielpikowski et al. | |
| 4,940,464 A | 7/1990 | Van Gompel et al. | |
| 5,057,368 A | 10/1991 | Largman et al. | |
| 5,069,970 A | 12/1991 | Largman et al. | |
| 5,093,422 A | 3/1992 | Himes | |
| 5,108,820 A | 4/1992 | Kaneko et al. | |
| 5,162,074 A | 11/1992 | Hills | |
| 5,272,236 A | 12/1993 | Lai et al. | |
| 5,277,976 A | 1/1994 | Hogle et al. | |
| 5,278,272 A | 1/1994 | Lai et al. | |
| 5,284,703 A | 2/1994 | Everhart et al. | |
| 5,304,599 A | 4/1994 | Himes | |
| 5,332,613 A | 7/1994 | Taylor et al. | |
| 5,336,552 A | 8/1994 | Strack et al. | |
| 5,350,624 A | 9/1994 | Georger et al. | |
| 5,382,400 A | 1/1995 | Pike et al. | |
| 5,458,590 A | 10/1995 | Schleinz et al. | |
| 5,466,410 A | 11/1995 | Hills | |
| 5,486,166 A | 1/1996 | Bishop et al. | |
| 5,490,846 A | 2/1996 | Ellis et al. | |
| 5,503,076 A | 4/1996 | Yeo | |
| 5,539,056 A | 7/1996 | Yang et al. | |
| 5,596,052 A | 1/1997 | Resconi et al. | |
| 5,628,737 A | 5/1997 | Dobrin et al. | |
| 5,744,001 A | 4/1998 | Linheart et al. | |
| 5,836,932 A | 11/1998 | Buell et al. | |
| 5,843,057 A | 12/1998 | McCormack | |
| 5,853,859 A * | 12/1998 | Levy et al. ........... 428/196 | |
| 5,855,999 A | 1/1999 | McCormack | |
| 5,932,497 A | 8/1999 | Morman et al. | |
| 5,997,981 A | 12/1999 | McCormack et al. | |
| 6,002,064 A | 12/1999 | Kobylivker et al. | |
| 6,015,764 A | 1/2000 | McCormack et al. | |
| 6,020,397 A * | 2/2000 | Matzinger ............... 523/160 | |
| 6,037,281 A | 3/2000 | Mathis et al. | |
| 6,111,163 A | 8/2000 | McCormack et al. | |
| 6,114,024 A | 9/2000 | Forte | |
| 6,149,934 A | 11/2000 | Krzysik et al. | |
| 6,153,209 A | 11/2000 | Vega et al. | |
| 6,198,018 B1 | 3/2001 | Curro | |
| 6,200,669 B1 | 3/2001 | Marmon et al. | |
| 6,203,810 B1 | 3/2001 | Alemany et al. | |
| 6,245,401 B1 | 6/2001 | Ying et al. | |
| 6,461,457 B1 | 10/2002 | Taylor et al. | |
| 6,572,600 B1 | 6/2003 | Roe et al. | |
| 6,794,024 B1 | 9/2004 | Walton et al. | |
| 7,141,617 B2 | 11/2006 | Gratson et al. | |
| 2003/0118816 A1 | 6/2003 | Polanco et al. | |
| 2003/0203162 A1 | 10/2003 | Fenwick et al. | |
| 2003/0207091 A1* | 11/2003 | Nair et al. ............... 428/195.1 | |
| 2003/0212200 A1 | 11/2003 | Bellas | |
| 2004/0091645 A1 | 5/2004 | Heederik et al. | |
| 2004/0109997 A1 | 6/2004 | Li et al. | |
| 2004/0121675 A1 | 6/2004 | Snowden et al. | |
| 2004/0175556 A1 | 9/2004 | Clark et al. | |
| 2005/0166783 A1 | 8/2005 | Ylitalo et al. | |
| 2006/0003150 A1 | 1/2006 | Braverman et al. | |
| 2006/0246263 A1 | 11/2006 | Yahiaoui et al. | |
| 2007/0066709 A1 | 3/2007 | Chen et al. | |
| 2008/0085384 A1 | 4/2008 | Ylitalo et al. | |

FOREIGN PATENT DOCUMENTS

| | | |
|---|---|---|
| GB | 1351976 A | 5/1974 |
| JP | 2993113 B | 12/1999 |
| WO | WO 9703138 A2 | 1/1997 |
| WO | WO 9912734 | 3/1999 |
| WO | WO 0183626 | 11/2001 |
| WO | WO 2004061200 A1 | 7/2004 |
| WO | WO 2005000977 | 1/2005 |
| WO | WO 2008042631 | 4/2008 |

* cited by examiner

SUBSTRATES HAVING IMPROVED INK ADHESION AND OIL CROCKFASTNESS

BACKGROUND OF THE INVENTION

Absorbent articles typically include an outercover constructed from a laminate of a liquid impermeable film and a nonwoven fabric constructed from hydrophobic polymeric fibers. These outercovers are difficult to print on in a fast and economical manner that is amenable to efficient ink adhesion and crockfastness. More particularly, it is difficult to get good ink adhesion to the visible surface of the nonwoven web of synthetic fibers.

The need for good ink adhesion to the outercover is enhanced by durability needs of the outercover. For example, when in use, the outercover of absorbent articles can contact oily compositions (e.g., baby oil, lotions, etc.), which can cause the ink to more easily rub off of the outercover. When the oily composition is on the skin of the wearer, or the skin of a caretaker, the ink may rub off of the outercover and onto the skin. Thus, the ink causes unwanted ink stains on the skin of the wearer and/or the caretaker, as well as deteriorate the overall look of the outercover.

In order to protect a design applied to an outer cover, the designs have been printed onto the underlying film layer of the outercover, so that the overlying nonwoven polymeric fabric can help protect the design from rubbing off. While the nonwoven polymeric fabric may protect the underlying design, it also reduces the vibrancy of the design's coloring that is apparent on the resulting absorbent article. In order to compensate for this loss in vibrancy, an excess amount of ink has sometimes been applied to the film, which increases the materials cost of the absorbent article. Additionally, this excess ink can require longer drying time, possibly leading to slower production speeds.

Accordingly, there is a need to improve adhesion of inks to the visible surface of a nonwoven web. Additionally, there exists a need to improve the crockfastness of an ink composition applied to the nonwoven surface of a film-web laminate, such as those useful as an outercover of an absorbent article.

SUMMARY OF THE INVENTION

Objects and advantages of the invention will be set forth in part in the following description, or may be obvious from the description, or may be learned through practice of the invention.

In general, the present disclosure is directed toward a nonwoven web formed from interlaid synthetic fibers, such as hydrophobic fibers (e.g., polyolefin fibers). An ink composition is applied to a visible surface of the nonwoven web. The ink composition includes a crosslinking agent in an amount of greater than about 3.5% by weight based on the dried weight of the ink composition, such as greater than about 7.5% by weight, or from about 40% by weight to about 80% by weight. The crosslinking agent is an aziridine oligomer with at least two aziridine functional groups. In one embodiment, the ink composition can further include an acrylic colloidal dispersion polymer. The nonwoven web can have an oil crockfastness of greater than about 3.8 or greater than about 4.0, or even greater than about 4.1.

In one particular embodiment, the nonwoven web can be laminated to a breathable film comprising micropores such that the visible surface of the nonwoven web is opposite of the breathable film For example, the printed laminate can be included in the construction of an absorbent article. The absorbent article can include an absorbent core positioned between a liquid permeable topsheet and a liquid impermeable backsheet (i.e., outercover). The backsheet is constructed of a nonwoven web overlying a film layer, and is positioned such that the film layer faces the absorbent core and the nonwoven web defines an outer exposed surface of the absorbent article. An ink composition is applied to the outer exposed surface of the nonwoven web. The ink composition comprises a crosslinking agent in an amount of greater than about 3.5% by weight based on the dried weight of the ink composition. The absorbent article can be a diaper, a training pant, a swimming pant, a feminine care product, etc.

In another embodiment, a method of printing to a nonwoven web is generally disclosed. The method includes printing an ink composition to a visible surface of a nonwoven web. For instance, the ink composition can be flexographically printed on the nonwoven web, or the ink composition can be ink jet printed on the nonwoven web.

Other features and aspects of the present invention are discussed in greater detail below.

BRIEF DESCRIPTION OF THE FIGURES

A full and enabling disclosure of the present invention, including the best mode thereof to one skilled in the art, is set forth more particularly in the remainder of the specification, which includes reference to the accompanying figures, in which.

Repeat use of reference characters in the present specification and drawings is intended to represent the same or analogous features or elements of the present invention.

DETAILED DESCRIPTION OF REPRESENTATIVE EMBODIMENTS

Definitions

As used herein the term "nonwoven fabric or web" refers to a web having a structure of individual fibers or threads which are interlaid, but not in an identifiable manner as in a knitted fabric. Nonwoven fabrics or webs have been formed from many processes such as for example, meltblowing processes, spunbonding processes, bonded carded web processes, etc.

As used herein, the term "meltblown web" generally refers to a nonwoven web that is formed by a process in which a molten thermoplastic material is extruded through a plurality of fine, usually circular, die capillaries as molten fibers into converging high velocity gas (e.g. air) streams that attenuate the fibers of molten thermoplastic material to reduce their diameter, which may be to microfiber diameter. Thereafter, the meltblown fibers are carried by the high velocity gas stream and are deposited on a collecting surface to form a web of randomly disbursed meltblown fibers. Such a process is disclosed, for example, in U.S. Pat. No. 3,849,241 to Butin, et al., which is incorporated herein in its entirety by reference thereto for all purposes. Generally speaking, meltblown fibers may be microfibers that are substantially continuous or discontinuous, generally smaller than 10 microns in diameter, and generally tacky when deposited onto a collecting surface.

As used herein, the term "spunbond web" generally refers to a web containing small diameter substantially continuous fibers. The fibers are formed by extruding a molten thermoplastic material from a plurality of fine, usually circular, capillaries of a spinnerette with the diameter of the extruded fibers then being rapidly reduced as by, for example, eductive drawing and/or other well-known spunbonding mechanisms. The production of spunbond webs is described and illustrated, for example, in U.S. Pat. No. 4,340,563 to Appel, et al., U.S. Pat. No. 3,692,618 to Dorschner, et al., U.S. Pat. No. 3,802,817 to Matsuki, et al., U.S. Pat. No. 3,338,992 to Kinney, U.S. Pat. No. 3,341,394 to Kinney, U.S. Pat. No. 3,502,763 to Hartman, U.S. Pat. No. 3,502,538 to Levy, U.S. Pat. No. 3,542,615 to Dobo, et al., and U.S. Pat. No. 5,382,400 to Pike, et al., which are incorporated herein in their entirety by reference thereto for all purposes. Spunbond fibers are generally not tacky when they are deposited onto a collecting surface. Spunbond fibers may sometimes have diameters less than about 40 microns, and are often between about 5 to about 20 microns.

As used herein, the term "coform" generally refers to composite materials comprising a mixture or stabilized matrix of thermoplastic fibers and a second non-thermoplastic material. As an example, coform materials may be made by a process in which at least one meltblown die head is arranged near a chute through which other materials are added to the web while it is forming. Such other materials may include, but are not limited to, fibrous organic materials such as woody or non-woody pulp such as cotton, rayon, recycled paper, pulp fluff and also superabsorbent particles, inorganic and/or organic absorbent materials, treated polymeric staple fibers and so forth. Some examples of such coform materials are disclosed in U.S. Pat. No. 4,100,324 to Anderson, et al.; U.S. Pat. No. 5,284,703 to Everhart, et al.; and U.S. Pat. No. 5,350,624 to Georger, et al.; which are incorporated herein in their entirety by reference thereto for all purposes.

As used herein, the term "multicomponent fibers" generally refers to fibers that have been formed from at least two polymer components. Such fibers are typically extruded from separate extruders, but spun together to form one fiber. The polymers of the respective components are typically different, but may also include separate components of similar or identical polymeric materials. The individual components are typically arranged in substantially constantly positioned distinct zones across the cross-section of the fiber and extend substantially along the entire length of the fiber. The configuration of such fibers may be, for example, a side-by-side arrangement, a pie arrangement, or any other arrangement. Multicomponent fibers and methods of making the same are taught in U.S. Pat. No. 5,108,820 to Kaneko, et al., U.S. Pat. No. 4,795,668 to Kruege, et al., U.S. Pat. No. 5,382,400 to Pike, et al., U.S. Pat. No. 5,336,552 to Strack, et al., and U.S. Pat. No. 6,200,669 to Marmon, et al., which are incorporated herein in their entirety by reference thereto for all purposes. The fibers and individual components containing the same may also have various irregular shapes such as those described in U.S. Pat. No. 5,277,976 to Hogle, et al., U.S. Pat. No. 5,162,074 to Hills, U.S. Pat. No. 5,466,410 to Hills, U.S. Pat. No. 5,069,970 to Largman, et al., and U.S. Pat. No. 5,057,368 to Largman, et al., which are incorporated herein in their entirety by reference thereto for all purposes.

As used herein, the terms "elastomeric" and "elastic" refer to a material that, upon application of a stretching force, is stretchable in at least one direction (such as the CD direction), and which upon release of the stretching force, contracts/returns to approximately its original dimension. For example, a stretched material may have a stretched length that is at least 50% greater than its relaxed unstretched length, and which will recover to within at least 50% of its stretched length upon release of the stretching force. A hypothetical example would be a one (1) inch sample of a material that is stretchable to at least 1.50 inches and which, upon release of the stretching force, will recover to a length of not more than 1.25 inches. Desirably, such elastomeric sheet contracts or recovers at least 50%, and even more desirably, at least 80% of the stretch length in the cross machine direction.

As used herein, the term "breathable" means pervious to water vapor and gases, but impermeable to liquid water. For instance, "breathable barriers" and "breathable films" allow water vapor to pass therethrough, but are substantially impervious to liquid water. The "breathability" of a material is measured in terms of water vapor transmission rate (WVTR), with higher values representing a more vapor-pervious material and lower values representing a less vapor-pervious material. Typically, the "breathable" materials have a water vapor transmission rate (WVTR) of from about 500 to about 20,000 grams per square meter per 24 hours ($g/m^2/24$ hours), in some embodiments from about 1,000 to about 15,000 $g/m^2/24$ hours, and in some embodiments, from about 1,500 to about 14,000 $g/m^2/24$ hours.

As used herein, an "absorbent article" refers to any article capable of absorbing water or other fluids. Examples of some absorbent articles include, but are not limited to, personal care absorbent articles, such as diapers, training pants, absorbent underpants, adult incontinence products, feminine hygiene products (e.g., sanitary napkins), swim wear, baby wipes, and so forth; medical absorbent articles, such as garments, fenestration materials, underpads, bandages, absorbent drapes, and medical wipes; food service wipers; clothing articles; and so forth. Materials and processes suitable for forming such absorbent articles are well known to those skilled in the art.

As used herein, the term "hydrophobic substrate" is meant to include any shaped article, provided it is composed, in whole or in part, of a hydrophobic polymer and the term "porous hydrophobic substrate" is meant to include any substrate, provided it is porous and composed, in whole or in part, of a hydrophobic polymer. For example, the hydrophobic substrate may be a sheet-like material, such as a sheet of a foamed material. The hydrophobic substrate also may be a fibrous fabric, such as fibrillated film or a woven or nonwoven web or fabric. These structures can be predominately hydrophobic or can be selectively treated exhibiting different hydrophobic zones. Nonwoven fabrics include, but are not limited to, a meltblown fabric, a spunbonded fabric, a carded fabric or an airlaid fabric. The hydrophobic substrate also may be a laminate of two or more layers of a sheet-like material. For example, the layers may be independently selected from the group consisting of meltblown fabrics and spunbonded fabrics. However, other sheet-like materials such as films or foams may be used in addition to, or instead of, meltblown and spunbonded fabrics. In addition, the layers of the laminate may be prepared from the same hydrophobic polymer or different hydrophobic polymers.

The term "hydrophobic polymer" is used herein to mean any polymer resistant to wetting, or not readily wet, by water, i.e., having a lack of affinity for water. Examples of hydrophobic polymers include, by way of illustration only, polyolefins, such as polyethylene, poly(isobutene), poly(isoprene), poly(4-methyl-1-pentene), polypropylene, ethylene-propylene copolymers, ethylene-propylene-hexadiene copolymers, and ethylene-vinyl acetate copolymers; styrene polymers, such as poly(styrene), poly(2-methylstyrene), styrene-acrylonitrile copolymers having less than about 20 mol-percent acrylonitrile, and styrene-2,2,3,3,-tetrafluoropropyl methacrylate copolymers; halogenated hydrocarbon polymers, such as poly(chlorotrifluoroethylene), chlorotrifluoroethylene-tetrafluoroethylene copolymers, poly(hexafluoropropylene), poly(tetrafluoroethylene), tetrafluoroethylene-ethylene copolymers, poly(trifluoroethylene), poly(vinyl fluoride), and poly(vinylidene fluoride); vinyl polymers, such as poly(vinyl butyrate), poly(vinyl decanoate), poly(vinyl dodecanoate), poly(vinyl hexadecanoate), poly(vinyl hexanoate), poly(vinyl propionate), poly(vinyl octanoate), poly (heptafluoroisopropoxyethylene), poly(heptafluoroisopropoxypropylene), and poly(methacrylonitrile); acrylic polymers, such as poly(n-butyl acetate), poly(ethyl acrylate), poly[(1-chlorodifluoromethyl)tetrafluoroethyl acrylate], poly[di(chlorofluoromethyl)fluoromethyl acrylate], poly(1,1-dihydroheptafluorobutyl acrylate), poly(1,1-dihydropentafluoroisopropyl acrylate), poly(1,1-dihydropentadecafluorooctyl acrylate), poly(heptafluoroisopropyl acrylate), poly[5-(heptafluoroisopropoxy)pentyl acrylate], poly[11-(heptafluoroisopropoxy)undecyl acrylate], poly[2-(heptafluoropropoxy)ethyl acrylate], and poly (nonafluoroisobutyl acrylate); methacrylic polymers, such as poly(benzyl methacrylate), poly(n-butyl methacrylate), poly (isobutyl methacrylate), poly(t-butyl methacrylate), poly(t-butylaminoethyl methacrylate), poly(dodecyl methacrylate), poly(ethyl methacrylate), poly(2-ethylhexyl methacrylate), poly(n-hexyl methacrylate), poly(phenyl methacrylate), poly (n-propyl methacrylate), poly(octadecyl methacrylate), poly (1,1-dihydropentadecafluorooctyl methacrylate), poly(heptafluoroisopropyl methacrylate), poly(heptadecafluorooctyl methacrylate), poly(1-hydrotetrafluoroethyl methacrylate), poly(1,1-dihydrotetrafluoropropyl methacrylate), poly(1-hydrohexafluoroisopropyl methacrylate), and poly)t-nonafluorobutyl methacrylate); and polyesters, such a poly(ethylene terephthalate) and poly(butylene terephthalate).

DETAILED DESCRIPTION

Reference now will be made to the embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only, and is not intended as limiting the broader aspects of the present invention, which broader aspects are embodied exemplary constructions.

In general, the present disclosure is directed to a printed nonwoven web of synthetic fibers. The web exhibits improved oil crockfastness when an ink composition is applied to a visible outer surface of the nonwoven web. For example, the ink composition has improved resistance to rub off of the outer surface of the nonwoven web, even if the ink composition contacts an oily substance (e.g., baby oil, lotion, etc.). Generally, the ink composition is configured to strengthen its attachment forces (e.g. chemical and/or mechanical) to the nonwoven web, even if the ink composition is water-based. As such, the ink composition can stay on the nonwoven web where it was applied, protecting the nonwoven's appearance and overall aesthetic look.

For example, the printed nonwoven web can exhibit an oil crockfastness of greater than about 3.8, such as greater than about 4.0, when measured according to the test method described herein. In some embodiments, the printed nonwoven web can exhibit an oil crockfastness of greater than about 4.1, such as greater than about 4.2.

In one embodiment, the printed surface of the nonwoven web can be the visible surface of a laminate. For example, the printed surface can be an outward facing surface (e.g., outer visible surface) of an outercover film-web laminate of an absorbent article. As such, the ink composition can be printed directly onto the outer facing nonwoven surface of the outer cover, instead of on an underlying layer of the outer cover laminate (e.g., a film). In use, the ink composition is inhibited from rubbing off of the outer cover and onto the skin of a wearer or a caretaker, even if the outer cover contacts an oily substance. Thus, less ink can be applied to the outward facing nonwoven layer of the outer cover, when compared to printing on the inner film layer, while still achieving the desired aesthetic design and the desired oil crockfastness. Furthermore, the color vibrancy of the ink composition printed on the outward facing nonwoven can be retained without being hindered by an overlying layer.

A. Nonwoven Webs

According to the present invention, an ink composition is applied (e.g. printed) onto a nonwoven web of synthetic fibers. The synthetic fibers can generally be hydrophobic fibers. In one particular embodiment, the fibers of the nonwoven web are primarily hydrophobic synthetic fibers. For example, greater than about 90% of the fibers of the web can be hydrophobic synthetic fibers, such as greater than about 95%. In one embodiment, substantially all of the fibers of the nonwoven web (i.e., greater than about 98%, greater than about 99%, or about 100%) are hydrophobic synthetic fibers.

The nonwoven web can be made by any number of processes. As a practical matter, however, the nonwoven fabrics and the fibers that make up nonwoven fabrics usually will be prepared by a melt-extrusion process and formed into the nonwoven fabric. The term melt-extrusion process includes, among others, such well-known processes as meltblowing and spunbonding. Other methods for preparing nonwoven fabrics are, of course, known and may be employed. Such methods include air laying, wet laying, carding, and so forth. In some cases it may be either desirable or necessary to stabilize the nonwoven fabric by known means, such as thermal point bonding, through-air bonding, and hydroentangling.

As stated, the nonwoven web can primarily include synthetic fibers, particularly synthetic hydrophobic fibers, such as polyolefin fibers. In one particular embodiment, polypropylene fibers can be used to form the nonwoven web. The polypropylene fibers may have a denier per filament of about 1.5 to 2.5, and the nonwoven web may have a basis weight of about 17 grams per square meter (0.5 ounce per square yard). Furthermore, the nonwoven fabric may include bicomponent or other multicomponent fibers. Exemplary multicomponent nonwoven fabrics are described in U.S. Pat. No. 5,382,400 issued to Pike et al., U.S. Publication no. 2003/0118816 entitled "High Loft Low Density Nonwoven Fabrics Of Crimped Filaments And Methods Of Making Same" and U.S. Publication no. 2003/0203162 entitled "Methods For Making Nonwoven Materials On A Surface Having Surface Features And Nonwoven Materials Having Surface Features" which are hereby incorporated by reference herein in their entirety.

Sheath/core bicomponent fibers where the sheath is a polyolefin such as polyethylene or polypropylene and the core is polyester such as poly(ethylene terephthalate) or poly(butylene terephthalate) can also be used to produce carded fabrics or spunbonded fabrics. The primary role of the polyester core is to provide resiliency and thus to maintain or recover bulk under/after load. Bulk retention and recovery plays a role in separation of the skin from the absorbent structure. This separation has shown an effect on skin dryness. The combination of skin separation provided with a resilient structure along with a treatment such of the present invention can provide an overall more efficient material for fluid handling and skin dryness purposes.

Since the ink composition can have improved crockfastness when applied to the nonwoven web, adhesion promoting pre-treatments can be eliminated. As such, the ink composition can be applied directed to a surface of the hydrophobic nonwoven web, without any other layer or coating positioned between the surface of the nonwoven web and the ink composition. However, if desired, a treatment composition can be applied to the nonwoven web prior to application of the ink composition to further adhere the ink composition to the nonwoven web. Exemplary treatment compositions that can be utilized are disclosed in U.S. Publication No. 2004/0121675 of Snowden, et al., U.S. Publication No. 2006/0003150 to Braverman, et al., and U.S. Publication No. 2006/0246263 to Yahiaoui, et al., all of which are herein incorporated by reference.

In one embodiment, the polymeric substrate can be a functionalized polymeric substrate. For example, the polymeric substrate can be functionalized on the surface of the polymeric substrate, such as oxidized on the polymeric substrate's surface. Any means for functionalizing the polymeric substrate can be used, such as, for example, Corona discharge, plasma discharge, flame treatment, o-zone treatment, or the like. These processes can be performed at various atmospheric pressures.

For example, Corona treatment, which is known in the art of plastic films, generally describes the process of applying an electrical discharge between two narrowly spaced electrodes obtained under atmospheric pressure from a high voltage current. The electrical field generated by the electrodes excites the gas molecules (air) and dissociates some of those molecules to generate a glow of highly energetic species of ions, radicals, metastables and photons. When a polymeric substrate, such as a polyolefin, is passed between the two electrodes and is exposed to the glow of active species, changes occur to the polymeric substrate's surface, which usually results in surface oxidation or addition of polar functionalities on the polymeric substrate's surface. These polar functional groups have a strong chemical affinity to the polar chemicals in both the treatment composition as well as in the ink compositions, which results in improved adhesion. Similarly, the more polar polymeric substrate's surface results in an increased surface energy that correlates with improved wettability. For example, the corona treatment may be applied at a level of about 2-50 watts per square foot of web per minute, preferably about 15-40 watts per square foot per minute, more preferably about 8-12 watts per square foot per minute.

Other methods of generating polar groups on the polymeric substrate's surface may also be employed, for example, a plasma technique under low pressures or atmospheric conditions and under various chemical environments, such as helium, argon, nitrogen, oxygen, carbon dioxide, ammonia, acetylene, and the like, and any mixture or combination thereof. Plasma treatment is mechanistically very similar to corona with the exception that a variety of gases can be injected into the glow discharge to modify the polymeric substrate with a broader range of functional groups.

Functionalization, such as oxidation, of the polymeric substrate's surface generally imparts a functional group to a polymeric substrate, such as a polyolefin. The polar functions include, for example, hydroxyls, carbonyls, amines, amides, and others, and any combination thereof. Methods of subjecting a material to functionalization and oxidation are well known by those skilled in the art, including those methods and processes described in U.S. Pat. No. 5,945,175 issued to Yahiaoui, et al, and assigned to Kimberly-Clark Worldwide, Inc, the disclosure of which is herein incorporated by reference in its entirety.

As stated, the nonwoven web can be included as an outer surface of a laminate. When included as part of a laminate, the nonwoven web generally provides a more cloth-like feeling to the laminate. For example, a film-web laminate can be formed from the nonwoven web overlying a film layer. In one embodiment, for instance, the nonwoven web is thermally laminated to the film to form the film-web laminate. However, any suitable technique can be utilized to form the laminate. Suitable techniques for bonding a film to a nonwoven web are described in U.S. Pat. No. U.S. Pat. No. 5,843,057 to McCormack; U.S. Pat. No. 5,855,999 to McCormack; U.S. Pat. No. 6,002,064 to Kobylivker, et al.; U.S. Pat. No. 6,037,281 to Mathis, et al.; and WO 99/12734, which are incorporated herein in their entirety by reference thereto for all purposes.

The film layer of the laminate is typically formed from a material that is substantially impermeable to liquids. For example, the film layer may be formed from a thin plastic film or other flexible liquid-impermeable material. In one embodiment, the film layer is formed from a polyethylene film having a thickness of from about 0.01 millimeter to about 0.05 millimeter. For example, a stretch-thinned polypropylene film having a thickness of about 0.015 millimeter may be thermally laminated to the nonwoven web.

In addition, the film layer may be formed from a material that is impermeable to liquids, but permeable to gases and water vapor (i.e., "breathable"). This permits vapors to pass through the laminate, but still prevents liquid exudates from passing through the laminate. The use of a breathable laminate is especially advantageous when the laminate is used as an outercover of an absorbent article to permit vapors to escape from the absorbent core, but still prevents liquid exudates from passing through the outer cover. For example, the breathable film may be a microporous or monolithic film.

The film may be formed from a polyolefin polymer, such as linear, low-density polyethylene (LLDPE) or polypropylene. Examples of predominately linear polyolefin polymers include, without limitation, polymers produced from the following monomers: ethylene, propylene, 1-butene, 4-methylpentene, 1-hexene, 1-octene and higher olefins as well as copolymers and terpolymers of the foregoing. In addition, copolymers of ethylene and other olefins including butene, 4-methyl-pentene, hexene, heptene, octene, decene, etc., are also examples of predominately linear polyolefin polymers.

If desired, the breathable film may also contain an elastomeric polymer, such as elastomeric polyesters, elastomeric polyurethanes, elastomeric polyamides, elastomeric polyolefins, elastomeric copolymers, and so forth. Examples of elastomeric copolymers include block copolymers having the general formula A-B-A' or A-B, wherein A and A' are each a thermoplastic polymer endblock that contains a styrenic moiety (e.g., poly(vinyl arene)) and wherein B is an elastomeric polymer midblock, such as a conjugated diene or a lower alkene polymer (e.g., polystyrene-poly(ethylene-butylene)-polystyrene block copolymers). Also suitable are polymers composed of an A-B-A-B tetrablock copolymer, such as discussed in U.S. Pat. No. 5,332,613 to Taylor, et al., which is incorporated herein in its entirety by reference thereto for all purposes. An example of such a tetrablock copolymer is a styrene-poly(ethylene-propylene)-styrene-poly(ethylene-propylene) ("S-EP-S-EP") block copolymer. Commercially available A-B-A' and A-B-A-B copolymers include several different formulations from Kraton Polymers of Houston, Tex. under the trade designation KRATON®. KRATON® block copolymers are available in several different formulations, a number of which are identified in U.S. Pat. Nos. 4,663,220, 4,323,534, 4,834,738, 5,093,422 and 5,304,599, which are hereby incorporated in their entirety by reference thereto for all purposes. Other commercially available block copolymers include the S-EP-S or styrene-poly(ethylene-propylene)-styrene elastomeric copolymer available from Kuraray Company, Ltd. of Okayama, Japan, under the trade name SEPTON®.

Examples of elastomeric polyolefins include ultra-low density elastomeric polypropylenes and polyethylenes, such as those produced by "single-site" or "metallocene" catalysis methods. Such elastomeric olefin polymers are commercially available from ExxonMobil Chemical Co. of Houston, Tex. under the trade designations ACHIEVE® (propylene-based), EXACT® (ethylene-based), and EXCEED® (ethylene-based). Elastomeric olefin polymers are also commercially available from DuPont Dow Elastomers, LLC (a joint venture between DuPont and the Dow Chemical Co.) under the trade designation ENGAGE® (ethylene-based) and AFFINITY® (ethylene-based). Examples of such polymers are also described in U.S. Pat. Nos. 5,278,272 and 5,272,236 to Lai, et al., which are incorporated herein in their entirety by reference thereto for all purposes. Also useful are certain elastomeric polypropylenes, such as described in U.S. Pat. Nos. 5,539,056 to Yang, et al. and U.S. Pat. No. 5,596,052 to Resconi, et al., which are incorporated herein in their entirety by reference thereto for all purposes.

If desired, blends of two or more polymers may also be utilized to form the breathable film. For example, the film may be formed from a blend of a high performance elastomer and a lower performance elastomer. A high performance elastomer is generally an elastomer having a low level of hysteresis, such as less than about 75%, and in some embodiments, less than about 60%. Likewise, a low performance elastomer is generally an elastomer having a high level of hysteresis, such as greater than about 75%. The hysteresis value may be determined by first elongating a sample to an ultimate elongation of 50% and then allowing the sample to retract to an amount where the amount of resistance is zero. Particularly suitable high performance elastomers may include styrenic-based block copolymers, such as described above and commercially available from Kraton Polymers of Houston, Tex. under the trade designation KRATON®. Likewise, particularly suitable low performance elastomers include elastomeric polyolefins, such as metallocene-catalyzed polyolefins (e.g., single site metallocene-catalyzed linear low density polyethylene) commercially available from DuPont Dow Elastomers, LLC under the trade designation AFFINITY®. In some embodiments, the high performance elastomer may constitute from about 25 wt. % to about 90 wt. % of the polymer component of the film, and the low performance elastomer may likewise constitute from about 10 wt. % to about 75 wt. % of the polymer component of the film. Further examples of such a high performance/low performance elastomer blend are described in U.S. Pat. No. 6,794,024 to Walton, et al., which is incorporated herein in its entirety by reference thereto for all purposes.

As stated, the breathable film may be microporous. The micropores form what is often referred to as tortuous pathways through the film. Liquid contacting one side of the film does not have a direct passage through the film. Instead, a network of microporous channels in the film prevents liquids from passing, but allows gases and water vapor to pass. Microporous films may be formed from a polymer and a filler (e.g., calcium carbonate). Fillers are particulates or other forms of material that may be added to the film polymer extrusion blend and that will not chemically interfere with the extruded film, but which may be uniformly dispersed throughout the film. Generally, on a dry weight basis, based on the total weight of the film, the film includes from about 30% to about 90% by weight of a polymer. In some embodiments, the film includes from about 30% to about 90% by weight of a filler. Examples of such films are described in U.S. Pat. No. U.S. Pat. No. 5,843,057 to McCormack; U.S. Pat. No. 5,855,999 to McCormack; U.S. Pat. No. 5,932,497 to Morman, et al.; U.S. Pat. No. 5,997,981 to McCormack et al.; U.S. Pat. No. 6,002,064 to Kobylivker, et al.; U.S. Pat. No. 6,015,764 to McCormack, et al.; U.S. Pat. No. 6,037,281 to Mathis, et al.; U.S. Pat. No. 6,111,163 to McCormack, et al.; and U.S. Pat. No. 6,461,457 to Taylor, et al., which are incorporated herein in their entirety by reference thereto for all purposes.

The films are generally made breathable by stretching the filled films to create the microporous passageways as the polymer breaks away from the filler (e.g., calcium carbonate) during stretching. For example, the breathable material contains a stretch-thinned film that includes at least two basic components, i.e., a polyolefin polymer and filler. These components are mixed together, heated, and then extruded into a film layer using any one of a variety of film-producing processes known to those of ordinary skill in the film processing art. Such film-making processes include, for example, cast embossed, chill and flat cast, and blown film processes.

Another type of breathable film is a monolithic film that is a nonporous, continuous film, which because of its molecular structure, is capable of forming a liquid-impermeable, vapor-permeable barrier. Among the various polymeric films that fall into this type include films made from a sufficient amount of poly(vinyl alcohol), polyvinyl acetate, ethylene vinyl alcohol, polyurethane, ethylene methyl acrylate, and ethylene methyl acrylic acid to make them breathable. Without intending to be held to a particular mechanism of operation, it is believed that films made from such polymers solubilize water molecules and allow transportation of those molecules from one surface of the film to the other. Accordingly, these films may be sufficiently continuous, i.e., nonporous, to make them substantially liquid-impermeable, but still allow for vapor permeability.

Breathable films, such as described above, may constitute the entire breathable material, or may be part of a multilayer film. Multilayer films may be prepared by cast or blown film coextrusion of the layers, by extrusion coating, or by any conventional layering process. Further, other breathable materials that may be suitable for use in the present invention are described in U.S. Pat. No. 4,341,216 to Obenour; U.S. Pat. No. 4,758,239 to Yeo, et al.; U.S. Pat. No. 5,628,737 to Dobrin, et al.; U.S. Pat. No. 5,836,932 to Buell; U.S. Pat. No. 6,114,024 to Forte; U.S. Pat. No. 6,153,209 to Vega, et al.; U.S. Pat. No. 6,198,018 to Curro; U.S. Pat. No. 6,203,810 to Alemany, et al.; and U.S. Pat. No. 6,245,401 to Ying, et al., which are incorporated herein in their entirety by reference thereto for all purposes.

In one embodiment, the laminate is consists only of two layers: the nonwoven web and the film. On the other hand, in some embodiments, other layers may be included in the laminate, so long as the nonwoven web defines an outer surface of the laminate for receiving the ink composition. When present, the other layer(s) of the laminate can include, nonwoven webs, films, foams, etc.

In one particular embodiment, the nonwoven web is suitable for use as a layer of a backsheet laminate (i.e., outer-cover) of an absorbent article. The backsheet of absorbent articles is typically a liquid impermeable sheet, and may also be breathable. For example, in one particular embodiment, the backsheet is a laminate of a liquid impervious film attached to a nonwoven web of polyolefin fibers.

Figure 1:
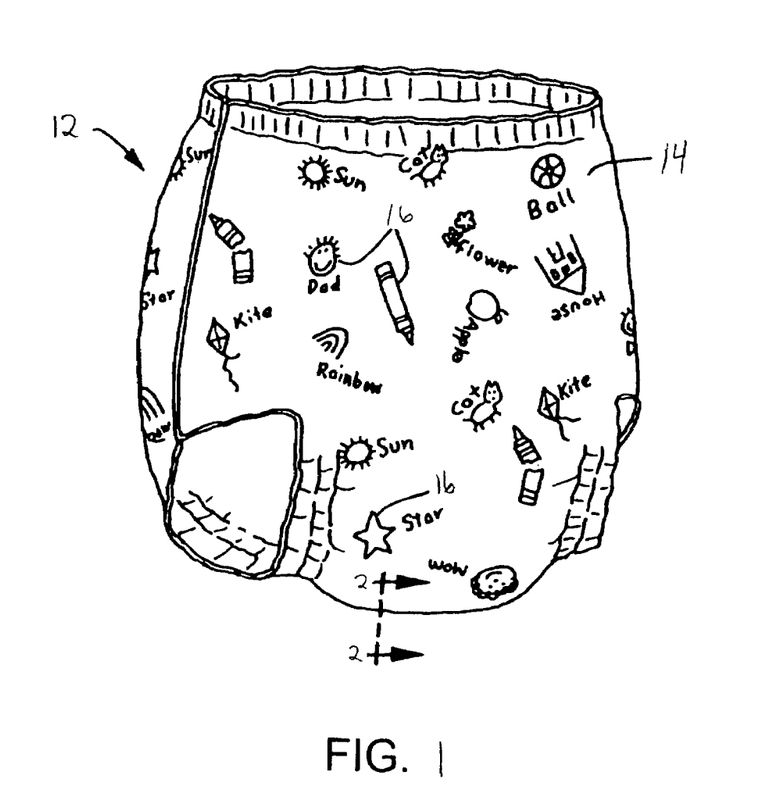
FIG. 1 is a perspective view of an exemplary training pant 10.
Figure 2:
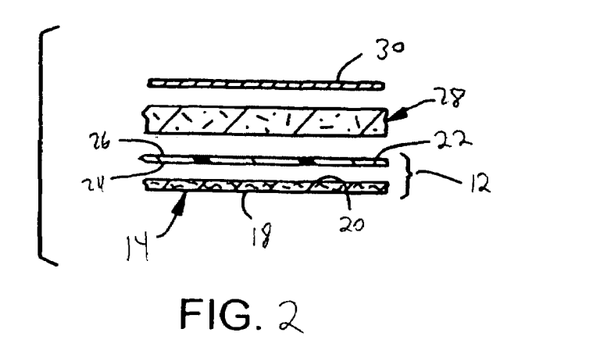
FIG. 2 is an exploded cross-sectional view of FIG. 1 taken along line 2-2.

An exemplary printed nonwoven web laminate used in the construction of an exemplary training pant is illustrated in FIGS. 1 and 2. FIG. 1 is a perspective view of an exemplary training pant 10, and FIG. 2 is an exploded cross-sectional view of FIG. 1 taken along line 2-2. It is an outer visible surface 18 of a nonwoven web 14 that presents or forms the outermost, visible surface of a training pant 10 and on which images 16 are printed. The illustrated exemplary printed nonwoven web 14 is utilized as the outward facing layer of a backsheet 12 of the training pant 10, but could be incorporated on any of a variety of absorbent articles upon which printed information or designs might be desirable including, but not limited to, diapers, feminine care products, incontinence products, training pants, swimming pants, and so forth.

For example, in FIGS. 1 and 2, the training pant 10 comprises the backsheet 12, which can be a two-layered laminate that includes a nonwoven polyolefin fibrous web 14 suitably joined to a liquid impervious film 22. The web 14 has opposed surfaces such as an inner surface 20 and an outer visible surface 18. A film 22 has opposed surfaces such as a surface 24 facing an inner surface 20 of the web 14 and a surface 26 that faces toward an absorbent composite 26.

One way to make these products more appealing is to print in bright colors on the products. Any desired design or other image can be applied or printed on the outer visible surface 18 defined by the nonwoven web using the ink composition disclosed herein. For example, a number of intricate, registered images can be printed on the outer visible surface 18 of the backsheet 12. By outer "visible" surface is meant that surface of the product that is visible when the product is worn (i.e., the exposed outer surface of the absorbent article). As stated, the inclusion of the crosslinking agent in the ink composition can inhibit the design from rubbing off during use of the article. As such, the designs can resist fading on the outercover, as well as preventing staining of anything (e.g., skin) that contacts the outercover.

A liquid permeable topsheet 30 (i.e., the bodyside liner) is positioned on the side of the absorbent core 28 opposite to the backsheet 12, and is the layer that is against the skin of the wearer.

The liquid permeable topsheet 30 is generally employed to help isolate the wearer's skin from liquids held in the absorbent core 28. For example, the liquid permeable topsheet 30 presents a bodyfacing surface that is typically compliant, soft feeling, and non-irritating to the wearer's skin. Typically, the liquid permeable topsheet 30 is also less hydrophilic than the absorbent core 28 so that its surface remains relatively dry to the wearer. The liquid permeable topsheet 30 permits liquid to readily penetrate through its thickness.

The liquid permeable topsheet 30 may be formed from a wide variety of materials, such as porous foams, reticulated foams, apertured plastic films, natural fibers (e.g., wood or cotton fibers), synthetic fibers (e.g., polyester or polypropylene fibers), or a combination thereof. In some embodiments, woven and/or nonwoven fabrics are used for the liquid permeable topsheet 30. For example, the liquid permeable topsheet 30 may be formed from a meltblown or spunbonded web of polyolefin fibers. The liquid permeable topsheet 30 may also be a bonded-carded web of natural and/or synthetic fibers. The liquid permeable topsheet 30 may further be composed of a substantially hydrophobic material that is optionally treated with a surfactant or otherwise processed to impart a desired level of wettability and hydrophilicity. The surfactant may be applied by any conventional method, such as spraying, printing, brush coating, foaming, and so forth. When utilized, the surfactant may be applied to the entire liquid permeable topsheet 30 or may be selectively applied to particular sections of the liquid permeable topsheet 30, such as to the medial section along the longitudinal centerline of the diaper. The liquid permeable topsheet 30 may further include a composition that is configured to transfer to the wearer's skin for improving skin health. Suitable compositions for use on the liquid permeable topsheet 30 are described in U.S. Pat. No. 6,149,934 to Krzysik et al., which is incorporated herein in its entirety by reference thereto for all purposes.

The absorbent core 28 may be formed from a variety of materials, but typically includes a matrix of hydrophilic fibers. In one embodiment, an absorbent web is employed that contains a matrix of cellulosic fluff fibers. One type of fluff that may be used in the present invention is identified with the trade designation CR1654, available from U.S. Alliance of Childersburg, Ala., and is a bleached, highly absorbent sulfate wood pulp containing primarily softwood fibers. Airlaid webs may also be used. In an airlaying process, bundles of small fibers having typical lengths ranging from about 3 to about 19 millimeters are separated and entrained in an air supply and then deposited onto a forming screen, usually with the assistance of a vacuum supply. The randomly deposited fibers then are bonded to one another using, for example, hot air or a spray adhesive. Another type of suitable absorbent nonwoven web for the absorbent core 28 is a coform material, which may be a blend of cellulose fibers and meltblown fibers.

In some embodiments, the absorbent core 28 may contain a superabsorbent material, e.g., a water-swellable material capable of absorbing at least about 20 times its weight and, in some cases, at least about 30 times its weight in an aqueous solution containing 0.9 weight percent sodium chloride. The superabsorbent materials may be natural, synthetic and modified natural polymers and materials. In addition, the superabsorbent materials may be inorganic materials, such as silica gels, or organic compounds such as cross-linked polymers. Examples of synthetic superabsorbent material polymers include the alkali metal and ammonium salts of poly(acrylic acid) and poly(methacrylic acid), poly(acrylamides), poly(vinyl ethers), maleic anhydride copolymers with vinyl ethers and alpha-olefins, poly(vinyl pyrrolidone), poly(vinylmorpholinone), poly(vinyl alcohol), and mixtures and copolymers thereof. Further superabsorbent materials include natural and modified natural polymers, such as hydrolyzed acrylonitrile-grafted starch, acrylic acid grafted starch, methyl cellulose, chitosan, carboxymethyl cellulose, hydroxypropyl cellulose, and the natural gums, such as alginates, xanthan gum, locust bean gum and so forth. Mixtures of natural and wholly or partially synthetic superabsorbent polymers may also be useful in the present invention. Other suitable absorbent gelling materials are disclosed in U.S. Pat. No. 3,901,236 to Assarsson et al.; U.S. Pat. No. 4,076,663 to Masuda et al.; and U.S. Pat. No. 4,286,082 to Tsubakimoto et al., which are incorporated herein in their entirety by reference thereto for all purposes.

Although not specifically illustrated, absorbent articles, such as the exemplary training pant shown in FIG. 1, may also include other layers not illustrated. For example, a surge layer can be included in the construction of the article to help decelerate and diffuse surges or gushes of liquid that may be rapidly introduced into the absorbent core 28. Desirably, the surge layer can rapidly accept and temporarily hold the liquid prior to releasing it into the storage or retention portions of the absorbent core 28. Typically, when included in the article, the surge layer is interposed between liquid permeable topsheet and the absorbent core. Alternatively, the surge layer may be located on an outwardly facing surface of the liquid permeable topsheet. The surge layer is typically constructed from highly liquid-permeable materials. Suitable materials may include porous woven materials, porous nonwoven materials, and apertured films. Some examples include, without limitation, flexible porous sheets of polyolefin fibers, such as polypropylene, polyethylene or polyester fibers; webs of spunbonded polypropylene, polyethylene or polyester fibers; webs of rayon fibers; bonded carded webs of synthetic or natural fibers or combinations thereof. Other examples of suitable surge layers are described in U.S. Pat. No. 5,486,166 to Ellis, et al. and U.S. Pat. No. 5,490,846 to Ellis, et al., which are incorporated herein in their entirety by reference thereto for all purposes.

Besides the above-mentioned components, absorbent articles may also contain various other components as is known in the art. For example, the absorbent article may also contain a substantially hydrophilic tissue wrapsheet (not illustrated) that helps maintain the integrity of the airlaid fibrous structure of the absorbent core. The tissue wrapsheet is typically placed about the absorbent core over at least the two major facing surfaces thereof, and composed of an absorbent cellulosic material, such as creped wadding or a high wet-strength tissue. The tissue wrapsheet may be configured to provide a wicking layer that helps to rapidly distribute liquid over the mass of absorbent fibers of the absorbent core. The wrapsheet material on one side of the absorbent fibrous mass may be bonded to the wrapsheet located on the opposite side of the fibrous mass to effectively entrap the absorbent core. More detailed descriptions of a training pants can be found in U.S. Pat. No. 4,940,464, the entire contents of which are hereby incorporated by reference herein.

B. Ink Compositions

According to the present invention, the ink composition contains a crosslinking agent in an amount sufficient to crosslink molecules within the ink composition. As such, the ink composition becomes more coherent once applied to the substrate. For example, the ink composition can crosslink to form a 3-dimensional chemical structure once applied to the substrate. The 3-dimensional structure of the ink composition can inhibit the ink composition from rubbing off of the substrate through mechanical forces. For example, when applied to a nonwoven fabric, the ink composition can form a crosslinked structure that wraps around the fibers of the nonwoven fabric, effectively inhibiting the crosslinked ink composition from rubbing off of the fibers.

Additionally, the crosslinking agent may crosslink molecules within the ink composition to suitable sites on substrate itself. Thus, the ink composition can be chemically bonded to the substrate and inhibited from rubbing off of the fibers through chemical forces. For instance, when applied to a nonwoven web, the molecules within the ink composition can bond to polymers within the fibers of the nonwoven web.

Furthermore, it has been discovered by the present inventors that adding a relatively high amount of the crosslinking agent to the ink composition dramatically increases the oil crockfastness of the ink composition applied to the substrate. For example, the crosslinking agent can be added to the ink composition in an amount of greater than about 2% by weight based on the wet weight of the ink composition, such as greater than about 4% by weight. In some embodiments, the crosslinking agent can be present in an amount of from about 5% by weight to about 20% by weight, such as from about 7% by weight to about 15% by weight. For example, in one particular embodiment, the crosslinking agent can be present at about 10% to about 12% by weight in the ink composition. It should be noted that after application of the ink composition to the laminate, the dried ink composition will contain a greater percentage by dry weight of the crosslinking agent due to the solvent evaporating, as discussed in greater detail below.

Since ink compositions are generally configured to dry quickly after application to the substrate, the crosslinking agent does not have a long period to crosslink the ink composition. Thus, the amount of a crosslinking agent suitable to crosslink other types of compositions may not sufficiently crosslink an ink composition to substantially affect the oil crockfastness of the ink after application to the substrate. Without wishing to be bound by theory, it is believed that such a relatively high amount of the crosslinking agent in the ink composition can increase the amount of crosslinking that occurs once the ink composition is applied to the substrate. The rate of crosslinking is believed to increase during that short time after application of the substrate but prior to fully drying, and thus, the ink composition can sufficiently crosslink to the substrate and to itself.

The crosslinking agent can be selected from those agents configured to crosslink the ink composition to form a three dimensional chemical structure. Additionally, the crosslinking agent can facilitate bonding between the ink composition and the fibers of the nonwoven web. In some embodiments, the crosslinking agent may facilitate crosslinking at or slightly above room temperature so that the nonwoven web is not heated above its melting temperature during curing. In one particular embodiment, the crosslinking agent becomes active at a pH that is neutral or acidic so that the composition is kept at a pH of above 8 during mixing and application. The pre-crosslinking pH of the composition is kept above 8 by the use of a fugitive alkali, such as ammonia. Fugitive alkalis remain in solution until driven off by drying at room temperature, or alternatively, heating them a small amount to increase the evaporation rate. In any event, the curing temperature may be at a temperature below the melting temperature of the fabric. The loss of the alkali causes a drop in the pH of the composition that triggers the action of the crosslinking agent. Examples of suitable crosslinking agents that may be used in the present invention include, but are not limited to, XAMA-2, XAMA-7, and CX-100, which are available commercially from Noveon, Inc. of Cleveland, Ohio. These materials are aziridine oligomers with at least two aziridine functional groups.

Additionally, other adhesion promoters can be added to the ink composition. For example, Carboset 514H, available commercially from Noveon, Inc. of Cleveland, Ohio, is an acrylic colloidal dispersion polymer supplied in ammonia water, which can dry to a clear, water-resistant, non-tacky thermoplastic film.

In addition to the crosslinking agent, the ink compositions can generally contain a coloring agent (e.g., pigment or dye), a solvent, and any other desired ingredients. Typically, a pigment refers to a colorant based on inorganic or organic particles which do not dissolve in water or solvents. Usually pigments form an emulsion or a suspension in water. On the other hand, a dye generally refers to a colorant that is soluble in water or solvents.

The pigment or dye in the ink composition can be present in an amount effective to provide a visible mark once applied to the substrate. For example, the pigment or dye can be present in the ink composition at concentration between about 0.25% to about 40% based on the dry weight basis, and preferably between greater than or equal to about 1% and less than or equal to about 10%.

Suitable organic pigments, include dairylide yellow AAOT (for example, Pigment Yellow 14 Cl No. 21095), dairylide yellow AAOA (for example, Pigment Yellow 12 Cl No. 21090), Hansa Yellow, Cl Pigment Yellow 74, Phthalocyanine Blue (for example, Pigment Blue 15), lithol red (for example, Pigment Red 52:1 CI No. 15860:1). toluidine red (for example. Pigment Red 22 Cl No. 12315), dioxazine violet (for example, Pigment Violet 23 Cl No. 51319), phthalocyanine green (for example, Pigment Green 7 Cl No. 74260), phthalocyanine blue (for example, Pigment Blue 15 Cl No. 74160), naphthoic acid red (for example, Pigment Red 48:2 Cl No. 15865:2). Inorganic pigments include titanium dioxide (for example, Pigment White 6 Cl No. 77891), carbon black (for example, Pigment Black 7 CI No. 77266), iron oxides (for example, red, yellow. and brown), ferric oxide black (for example, Pigment Black 11 Cl No. 77499), chromium oxide (for example, green), ferric ammonium ferrocyamide (for example, blue), and the like.

Suitable dyes that may be used with the additive of the present invention include, for instance, acid dyes, and sulfonated dyes including direct dyes. Other suitable dyes include azo dyes (e.g., Solvent Yellow 14, Dispersed Yellow 23, and Metanil Yellow), anthraquinone dyes (e.g., Solvent Red 111, Dispersed Violet 1, Solvent Blue 56, and Solvent Orange 3), xanthene dyes (e.g., Solvent Green 4, Acid Red 52, Basic Red 1, and Solvent Orange 63), azine dyes (e.g., Jet Black), and the like.

The inks are generally dispersed or dissolved in a low viscosity carrier. Exemplary solvents are aliphatic hydrocarbons with common binder types, such as polyamide, shellac, nitro-cellulose, and styrene-maleic. Generally, solvent-based inks include non-catalytic, block urethane resin, which generally demonstrate superior durability over traditional flexographic binders, such as styrene-maleic, rosin-maleic, and acrylic solutions. Desired solvent blends include various acetates such as ethyl acetate, N-propyl acetate, isopropyl acetate, isobutyl acetate, N-butyl acetate, and blends thereof; various alcohols including ethyl alcohol, isopropyl alcohol, normal propyl alcohol, and blends thereof; and glycol ethers including Ektasolve® EP (ethylene glycol monopropyl ether), EB (ethylene glycol monobutyl ether), DM (diethylene glycol monomethyl ether), DP (diethylene glycol monopropyl ether), and PM (propylene glycol monomethyl ether), which may be obtained from Eastman Chemical of Kingsport, Tenn. Other glycols that may also be used are DOWANOL® obtainable from Dow Chemical of Midland, Mich. A desired solvent blend may be a blend of about 50 percent to about 75 percent glycol ether, about 25 percent to about 35 percent N-propyl acetate, and about 15 percent to about 25 percent N-butyl acetate.

Suitable water-based inks that may be used include emulsions that may be stabilized in water-ammonia and may further comprise alcohols, glycols, or glycol ethers as co-solvents. Generally, organic solvents (less than equal to about 7 percent) to water-based inks: alcohols, for example, propan-2-ol may be added for speeding up drying and assisting wetting, glycols, for example, mono propylene glycol to slow down drying, glycol ethers, for example, dipropyl glycol mono methyl ether to aid film formation. Such solvents may be commodity chemicals, commercially available from various companies. Generally, water-based ink includes self-crosslinking acrylic copolymer emulsion, which may have demonstrated superior durability over traditional non-crosslinking binders such as acrylic solutions and dispersion copolymers. Besides the solvent and pigments, the inks may comprise a binder or mixtures thereof. The binder helps stabilize the pigment onto the cover layer 12. Generally, the pigment-to-binder ratios is typically from 1:20 to 1:2.

Waxes may also be included in the ink composition to increase the slip and improve the rub-resistance of the inks of the printed polyolefin substrate. Common classifications of waxes include animal (for example, beeswax and lanolin), vegetable (for example, carnauba and candellilia), mineral (for example, paraffin and microcrystalline), and synthetic (for example. Polyethylene, polyethylene glycol, and Teflon®). In one embodiment, a wax can be present in an amount of about 0.5 percent to about 5 percent based on the total ink formulation weight when wet.

In one embodiment, the ink compositions used in the printing process to form the indicia are particulate-type ink compositions. The inks chosen should, of course, be safe for human use and should not have environmentally deleterious effects. Moreover, it is desirable that the ink composition is suitable for the intended printing process and is preferably temperature resistant to the process employed for forming the absorbent article, e.g., the temperatures used during a vacuum aperturing process and the like elevated heating processes.

C. Methods of Printing

The particular method of printing the ink composition onto the nonwoven web can be any suitable printing method, including flexographic, gravure, offset, ink-jet, etc. The printing method can be used to print any design, figure, or other image on the surface of the nonwoven web.

As well known in the art, each printing process generally requires a specific ink composition specially formulated for that particular printing process. The particular ink formulations generally compensate for differing printing conditions between different printing processes and differing print substrates. For example, ink compositions for ink-jet printing are considerably different than ink compositions for flexographic printing due in part to different types of printing systems used in the two processes.

For instance, flexographic inks are not limited by the type of coloring agent and can utilized dyes and/or pigments, even those pigments that contain a relatively large particle size. However, ink jet printing inks are generally limited to particle-free ink compositions, or at least those with a relatively small particle size. As such, ink jet inks typically include dyes as opposed to pigments as the coloring agent in the ink composition.

1. Flexographic Printing Ink Compositions

In one particular embodiment, the ink composition can be flexographically printed onto the nonwoven web, which can provide the proper balance of reduced costs, high speed, and high quality printing suitable for printing the nonwoven web. Generally, flexographic printing is a printing technology that uses flexible raised rubber plates or photopolymer plates to carry the image to the film. The flexible plates generally carry a low-viscosity ink directly onto the film. Flexographic printing processes can use either water-based or solvent based ink compositions. Because flexographic printing systems can use water soluble or water-based ink compositions, which are less expensive than oil-based ink compositions, flexographic printing typically costs less than other types of printing.

Flexographic inks are generally low-viscosity ink compositions, like those used in gravure and unlike those used in lithography. The low viscosity enables faster drying times and, as a result, faster production, which can lead to reduced processing costs. The viscosity of flexographic inks can be from about 300 centipoise (cP) to about 500 cP, at room temperature (e.g., about 20° C.). Measuring viscosity is generally known in the art, and can be accurately measured using a viscometer. For example, the standardized viscosity measuring method of ASTM D445 can be utilized.

Flexographic inks are generally about 50% solids when in the wet state, so applying 2% by weight of a crosslinking agent to the wet ink composition results in the dried ink composition containing about 3.5% to about 4% by dry weight of the crosslinking agent. Thus, the dried ink composition can contain greater than about 3.5% by weight of the crosslinking agent, such as greater than about 7.5% by weight, when flexographically printed onto the nonwoven web. In some embodiments, the dried ink composition can contain from about 10% by weight to about 30% by weight, such as from about 15% by weight to about 25% by weight, when flexographically printed onto the nonwoven web.

It has been discovered by the present inventors that the oil crockfastness of water-based flexographic ink compositions incorporating a crosslinking agent can increase more readily than the oil crockfastness of solvent-based flexographic ink compositions. Thus, flexographic printing of water-based ink compositions can provide additional advantages over other printing processes.

Water-based flexographic ink compositions can generally include a pigment or dye, a polymer resin, a binder or wax, an organic solvent, and water. Of course, such compositions may vary depending on the characteristics of the raw materials, the quality required, as well as different properties provided by numerous manufacturers.

2. Ink Jet Printing (e.g., Digital Printing) Ink Compositions

Ink jet ink compositions generally have relatively low viscosities, which enables the ink composition to be applied by spray or throw techniques through the ink jet head onto the substrate. The viscosity of ink jet ink compositions can be from about 0 cP to about 50 cP, such as about 0 cP to about 30 cP, at room temperature (e.g., about 20° C.). The ink jet ink compositions can be further subdivided into continuous ink compositions having viscosities of about 0 cP to about 5 cP, and non-continuous ink composition having viscosities of about 0 to about 30 cP.

Ink jet inks are generally from about 2% to about 5% solids when in the wet state, so applying 2% by weight of a crosslinking agent to the wet ink composition results in the dried ink composition containing about 25% to about 50% by dry weight of the crosslinking agent. Thus, the dried ink composition can contain greater than about 25% by weight of the crosslinking agent, such as greater than about 50% by weight, when ink jet printed onto the nonwoven web. In some embodiments, the dried ink composition can contain from about 40% by weight to about 80% by weight, such as from about 50% by weight to about 70% by weight, when ink jet printed onto the nonwoven web.

In some instances, the addition of such a relatively high amount of the crosslinking agent can increase the viscosity of the ink composition, especially if any premature crosslinking occurs before application of the ink composition to the nonwoven web, which can significantly impair ink jet printing. However, the present inventors have found that the addition of an adhesion promoter to the ink composition can reduce the amount of crosslinking agent used in the ink composition without significantly increasing the viscosity of the ink composition nor significantly affecting the crockfastness of the dried ink composition.

As stated, the adhesion promoter can be Carboset 514H, available commercially from Noveon, Inc. of Cleveland, Ohio, is an acrylic colloidal dispersion polymer supplied in ammonia water, which can dry to a clear, water-resistant, non-tacky thermoplastic film. For instance, the acrylic colloidal dispersion polymer can be added to the wet ink composition up to about 15% by weight, such as from about 1% to about 10% by weight, based on the wet weight of the ink composition.

Alternatively, the dried ink composition can contain the acrylic colloidal dispersion polymer up to about 80% by weight, such as from about 5% by weight to about 75% by weight. For example, the dried ink composition can contain the acrylic colloidal dispersion polymer from about 10% by weight to about 50% by weight.

Test Method

A crock test method was used to measure whether the combinations of treated nonwovens and inks had sufficient abrasion resistance. The crock test method was based upon American Association of Textile Chemists and Colorists (AATCC) Test Method 116-1983, which is incorporated herein in its entirety with a few modifications, as disclosed in international publication no WO 2004 061200A1.

The AATCC Test Method uses a device called a Rotary Vertical Crockmeter to rub a piece of test fabric against the sample specimen. This modified crock test method used a device called at Sutherland Rub Ink Tester (Sutherland 2000 Rubtester supplied by Danilee Company of San Antonio, Tex.) as an alternative to the Crockmeter. The Sutherland Rub Tester is used in the printing industry to evaluate the resistance of inks and coatings on printed substrates. It has a broader test area than the crockmeter. The test head is 2-inches×4-inches for an eight square inch test area. The test head is moved laterally over the test specimen in a shallow arc pattern. Various weights are available to alter the pressure on the test surface and the number of test "strokes" is variable. This test method used a 4.0 pound weight and 50 rub strokes at a frequency of 42 cycles per minute. The test specimen can be abraded against any material that can be readily attached to the opposing surface of the tester.

Under the AATCC method, any transfer of colorant is qualitatively rated from one to five against a standard scale. A five is equivalent to the absence of transfer and a one is equivalent to an extreme amount of colorant transfer. The primary difference between the test method used in the following examples and the AATCC method was a quantitative method of assigning a colorfastness value. The latter was achieved by using a Spectrodensiometer to assign a measurement of total colorant transfer. This measured value is known as "Delta E". An equation was then developed to convert the Delta E value to into a one to five value equivalent to the AATCC colorfastness scale.

According to the test procedure, test specimens were analyzed for the CIELAB color difference which is expressed as E. The E was then converted to a number between 1 and 5 using the following equation: C. R.=A exp. (−B) where A=5.063244 and B=0.059532 ($\Delta E$) if E is less than 12, or A=4.0561216 and B=0.041218($\Delta E$) if E is greater than 12. This number C. R. is the crockfastness rating. A rating of 1 corresponds to a low or bad result, while a rating of 5 is the highest possible test result, and this value would indicate that essentially no color was rubbed off the sample material.

With the Spectrodensitometer, greater objectivity in evaluating the results was possible due to less operator dependence, and it was also possible to achieve higher efficiency and consistency for on-line quality assurance. The X-Rite 938 Spectrodensitometer is manufactured by X-Rite, Inc., of Grandville, Mich.

Equipment and Materials Used
1. Sutherland 2000 Rub Tester (Danilee Co., San Antonio, Tex.). Sharp edges on the vertical rod were filed to reduce abrasion of nonwoven materials.
2. Crockmeter cloth, standard 2-inch by 6-inch (approximately 50 millimeter by 152 millimeter) test squares.
3. Paper Cutter, standard 12-inch by 12 inch (305 mm×305 mm) minimum cutting area, obtained from Testing Machines, Inc., Amityville, N.Y.
4. Room with standard conditions atmosphere: temperature=23±1° C. (73.4±1.8° F.) and relative humidity=50±2 percent. Testing outside the specified limits for temperature and humidity may not yield valid results.
5. X-Rite Spectrodensitometer 938 manufactured by X-Rite, Inc., of Grandville, Mich.

Specimen Preparation

The test specimens were a spunbond polypropylene web and film laminate having a basis weight of about 1 ounce per square yard. The test specimens were cut exactly 2.5 inches wide by 7.0 inches long, unless otherwise noted, with the test area centered on the square.

Testing Procedure
1. Cut samples approximately 2.5 inches wide by 7.0 inches long in the machine direction of the substrate unless otherwise noted in the special instructions.
2. Label a white 2-inch×6-inch cotton sheet with the individual sample information.
3. Place the white cotton sheet lengthwise parallel to the direction of the rub. Adhere sample to the base of the machine so that the printed surface faces up and the area to be tested is centered.
4. Weigh one piece of the crockmeter cloth. Thoroughly wet out the crockmeter cloth with baby oil, bringing the wet pickup to 65%+/−5% [% wet pickup=(($weight_{wet}$−$weight_{dry}$)/$weight_{dry}$)×100]. (When measuring the dry crockfastness, this step can be omitted. When measuring the wet crockfastness, water is substituted for baby oil.)
5. Adhere white crockmeter cloth to 4.0 pound weight by placing the sample to be tested (matching long side to long side) on the weight and taping the excess with 610 tape. Be sure that the sample is taught and the printed side of material is to be facing out when taped on to the weight.
6. Place the weight (4.0 pounds) and white cloth sample on the rub tester arm.
7. Set the rub tester for 50 rub strokes at 42 cycles per minute.
8. Start the rub tester and wait for the tester to stop.
9. Allow the tested sample to dry.
10. When the rub test for the sample is completed, staple the sample to the white cotton cloth with to a sheet of cardboard beneath the sample behind the cloth.
11. Once the rub testing for a batch of samples is completed Spectrodensiometer reading may begin. However, samples that were tested with water or oil must be allowed to dry in an open area of 24 hours before spectrodensiometer testing.
12. Be sure that the illuminate is set to $C^2$
13. Calibrate the spectrodensiometer on the white spot using the tile provided.
14. Be sure that the data mode for the printout is set to Difference mode and that it is D50/10 and Lab.
15. A white standard must be read in each new day of Spectrodensiometer reading or more frequently if noted in special instructions. This is done by piling 7 cotton cloths on top of each other and setting the reference with this.
16. Read each sample, reading the area that appears to have the most amount of ink transfer, beginning with the white standard if necessary then proceeding through the batch.
17. Number the sample during the reading consecutively from 1 to the end with number 1 being the white standard if necessary. These numbers should match the printout.
18. After reading all of the samples with the Spectrodensiometer, print out the report and label the report with sample information. (i.e. White standard and Sample identity.)

Optional Wet Sample Testing:
1. Weigh the Crockmeter cloth standard. Record the weight.
2. Thoroughly wet out the material with the appropriate solution.
3. Bring the wet pick-up to 65+/−.5 percent (This is done by wringing or blotting the excess solution from the material, weighing the material and calculating the percent pick-up. Calculate: wet weight minus dry weight divided by dry weight times 100=t pick-up). To prevent evaporation, prepare one wet cloth at a time for testing.
4. Proceed with Steps 4 through 18.

Evaluation

The next step is the second modification to the AATCC test procedure, as earlier described above. The second modification is that the amount of color transferred to the test specimen was measured using an X-Rite Spectrodensitometer, instead of the AATCC Chromatic Transference Scale or a grade scale measuring device. As earlier described, E is then obtained and converted to a crockfastness rating between 1 and 5 using the equation set forth above.

Each specific ink formulation was tested multiple times to obtain an average reading. The average was determined by individually calculating the crockfastness rating for each of the test specimens, summing the crockfastness ratings, and then dividing by the number of samples to get the average crockfastness rating.

EXAMPLES

In the following example, ink compositions were applied to a spunbond web of polypropylene fibers. The spunbond web was laminated to a polypropylene film to form a laminate. Then, the various ink compositions were printed onto the nonwoven side of the laminate and allowed to dry. Finally, the oil crockfastness of each sample was determined according to the test method explained above.

The results of each sample were then compared to the crockfastness of a similarly constructed laminate with the generic ink composition printed onto the film and protected by the nonwoven layer. This printed control laminate was taken from the diaper sold under the name HUGGIES® Supreme by Kimberly Clark, Inc. of Dallas, Tex.

In the Tables shown below, the ink compositions and additives available under the following trade names were utilized in the various samples below:

Huggies Supreme®-design—Huggies Supreme outercover. This consists of a film printed flexographically with an adhesively bonded spunbond on top.

Sun CR 48—This a solvent based ink designed for dry crockfast for K-C by Sun Chemical.

Vertec TAA—This is a Di-Iso-Propoxy Titanium Acetylacetonate ink additive made by ICI Americas INC Vertec IA10—This is a Butyl Titanium Phosphate ink additive made by ICI Americas INC.

EHEC—This is an ethyl hydroxyethyl cellulose made by Akzo Nobel Cellulosic Specialties as a thickening agent for rheology control. The trade name is Bermocoll.

Kymene 450—This is an aqueous solution of a cationic amine polymer-epicholorhydrin adduct used as a wet strength resin and produced by Hercules Inc.

Sun DP160—This is a solvent based ink produced by Sun Chemical.

AeroflexDP—This is a solvent based ink produced by Flint Inc.

Talc—Baby powder produced by Lander.

Xama 7-PENTAERYTHRITOL-TRIS-(B-(AZIRIDI-NYL)PROPIONATE) produced by Noveon.

Environmental Inks and Coatings—Water based ink produced by Environmental Inks and Coatings.

Atlantic Printing Ink—Water based ink produced by Atlantic Printing Ink

Aquasafe—Water based ink produced by Polytex

Control Pull Ups—Pull Ups Outercover consisting of a film printed with a solvent based ink and an adhesively laminated spunbond on top.

PLA—Poly lactic acid Nonwoven substrate

Carboset 514H—Acrylic colloidal dispersion produced by Noveon

Ethylene glycol—ethylene glycol produced by Fisher Scientific

Ammonium Zirconium (IV) Carbonate—Ammonium Zirconium (IV) Carbonate solution stabilized in water and produced by Sigma-Aldrich AirflexEF 9100—An emulsion containing vinyl acetate monomer and ethylene copolymer and produced by Air Products Polymers, L.P.

AirflexEP 1188—A polyvinyl acetate emulsion produced by Air Products Polymers, L.P.

Additionally, the following additives were utilized: polymers sold under the name Kraton D-1192 and Kraton 222D (Kraton Polymers, LLC, Houston Tex.); polymers sold under the name Permax (Noveon, Inc., Cleveland, Ohio); polymers sold under the name Kymene (Hercules, Inc., Wilmington, Del.);

In each ink sample, the percentage added was based on the weight percent of the ink composition (e.g., 2% addition of Xama 7 means that 2 grams of Xama 7 was added per 100 grams of ink composition).

Each ink sample was applied to the nonwoven web using an ink roller, available under the name Phantom Proofer with an anilox roll that has 110 lines/cm from Harper Scientific, according to the following process.

1. The handle was tightened so that the white tip is pressing on the rubber meter roll to create a little pressure. If the roller can not roll naturally then loosen this.
2. Using an eye dropper, a small pool of ink was put in the center of the two rolls.
3. Then with a smooth even hand movement roll down the nonwoven substrate. Size is dependent on testing but make sure it is at least 2 inches wide.
4. You can get 2 to 3 rolls in before needing to put more ink on the roller.
5. Cut a 2"×7" rectangle in preparation for the Sutherland rub test.

Example 1

Flexographic Ink Compositions

The oil crockfastness of different flexographic ink compositions were tested. The samples were each prepared by printing the flexographic ink composition onto the exposed surface of a spunbond nonwoven web of polypropylene fibers. The web was provided as the exposed surface of a laminate of the spunbond nonwoven web and a liquid impermeable polypropylene film. After drying, each of the samples was tested to determine the oil crockfastness (baby oil) of the sample, as shown in Table 1:

TABLE 1

| Sample No. | Sample | Crockfast Reading + STDDEV | | | | | |
|---|---|---|---|---|---|---|---|
| | | Dry | | Wet | | Oil | |
| 1 | Huggies Supreme ®-design 1 (control) | 4.96 | 0.01 | 4.95 | 0.01 | 4.73 | 0.02 |
| 2 | Huggies Supreme ®-design 2 (control) | 4.92 | 0.05 | 4.88 | 0.09 | 4.71 | 0.06 |
| 3 | Sun CR48, Cyan | 4.62 | 0.09 | 3.37 | 0.20 | 1.78 | 0.20 |
| 4 | Sun CR48, Magenta | 4.72 | 0.02 | 3.26 | 0.16 | 1.78 | 0.07 |
| 5 | Sun CR48, Cyan, Vertec TAA 10% - Additive | | | | | 1.52 | 0.22 |
| 6 | Sun CR48, Cyan, Vertec TAA 1% - Additive | | | | | 1.54 | 0.09 |
| 7 | Sun CR48, Magenta, Vertec IA10 10% - Additive | | | | | 1.35 | 0.12 |
| 8 | Sun CR48, Magenta, EHEC- Additive | | | | | 1.74 | 0.04 |
| 9 | Sun DP160, Cyan | 4.54 | 0.01 | 4.03 | 0.09 | 2.57 | 0.09 |
| 10 | Sun DP160, Magenta | 4.47 | 0.09 | 3.66 | 0.13 | 2.05 | 0.09 |
| 11 | Sun DP160, Cyan, Vertec TAA 10% - Additive | | | | | 1.54 | 0.03 |
| 12 | Sun DP160, Cyan, Vertec TAA 1% - Additive | | | | | 1.50 | 0.02 |
| 13 | Sun DP160, Cyan, Vertec IA10 10% - Additive | | | | | 1.19 | 0.06 |
| 14 | Flint AeroflexDP, Cyan | 3.27 | 0.61 | 3.15 | 0.09 | 1.46 | 0.09 |
| 15 | Flint AeroflexDP, Magenta | 4.69 | 0.08 | 3.25 | 0.10 | 1.59 | 0.01 |
| 16 | Flint AeroflexDP, Cyan, Vertec TAA 10% - Additive | | | | | 1.05 | 0.03 |
| 17 | Flint AeroflexDP, Cyan, Talc 10% - Additive | | | | | 1.32 | 0.13 |
| 18 | Flint AeroflexDP, Cyan, Vertec TAA 1% - Additive | | | | | 1.15 | 0.06 |
| 19 | Flint AeroflexDP, Cyan, Vertec IA10 10% Additive | | | | | 1.19 | 0.09 |

TABLE 1-continued

| Sample No. | Sample | Crockfast Reading + STDDEV | | | |
|---|---|---|---|---|---|
| | | Dry | Wet | Oil | |
| 20 | Flint AeroflexDP, Cyan, Xamas 7 10% - Additive | | | 1.46 | 0.03 |
| 21 | Polytex AquaPuff, Purple | 3.70 | 0.17 | 4.00 | 0.04 |
| 22 | Polytex AquaPuff, Pink | | | 4.60 | 0.08 |
| 23 | Polytex AquaRuff, Cyan | | | 3.97 | 0.10 |
| 24 | Polytex AquaDry | | | 4.17 | 0.19 |
| 25 | Polytex AquaChange, Pink | | | 4.63 | 0.04 |
| 26 | Polytex AquaChange, Blue | | | 4.63 | 0.02 |
| 27 | Polytex AquaSafe, Red | 3.30 | — | 3.82 | — |
| 28 | Polytex AquaSafe, Blue | 3.53 | — | 4.43 | — |
| 29 | Polytex AquaSafe, Green | 2.84 | — | 2.78 | — |
| 30 | Flint Ink w/no overcoat, Pull-ups | | | 2.66 | — |
| 31 | Flint - Pooh & Tigger graphics | | | 1.87 | 0.09 |
| 32 | DIC | | | 1.06 | 0.06 |
| 33 | Atlantic Printing Ink Cyan | 1.24 | .03 | 1.78 | .06 |
| 34 | Polytex Aquasafe (KC drawdown) | 1.49 | .92 | 2.58 | 1.00 |
| 35 | Polytex Aquasafe cyan + 10% Kymene 450 (pH 8.04) | | | 2.95 | 1.04 |
| 36 | Polytex AquaSafe + 10% Xamas 7 Cyan ph modified 9.5 | 3.94 | .19 | 4.16 | .08 |
| 37 | Polytex AquaSafe Magenta | 1.8 | .53 | 3.02 | .14 |
| 38 | Polytex AquaSafe Magenta + 10% Kymene 450 (ph modified 8.5) | 1.84 | .23 | 3.44 | .18 |
| 39 | Polytex AquaSafe Cyan + 10% Xamas 7 on PLA | | | 4.16 | .03 |
| 40 | Flint DP Cyan + 10% Xamas 7 (ph 9.5) | | | 1.51 | .08 |
| 41 | Polytex Overcoat over a blue boys pull up outer cover | | | 3.48 | .08 |
| 42 | Polytex AquaSafe Cyan ink printed on SMS by Polytex | 3.5 | N/A | 3.21 | N/A |
| 43 | Polytex Aquasafe Majenta ink printed on SMS by Polytex | 2.96 | N/A | 3.84 | N/A |
| 44 | Flint DP160 Cyan on PLA | | | 1.44 | .08 |
| 45 | Pull ups Control boy code blue | 3.66 | .16 | 2.09 | .16 |
| 46 | DPO160 Control | | | 2.86 | |
| 47 | DPO160 + 30% 514 H in Ink | | | 3.05 | |
| 48 | Girl Code Control | | | 2.18 | |
| 49 | Girl with 9BCM 514 OPV | | | 2.21 | |
| 50 | Flint DP160 Cyan + 10% Ethylene Glycol | | | 1.74 | .19 |
| 51 | Flint DP160 Cyan + 10% Ammonium Zirconium Carbonate | | | 1.71 | .08 |
| 52 | Flint AeroflexDP + 10% Airflex 9100 | | | 1.64 | .01 |
| 53 | Flint AeroflexDP + 10% Airflex 1188 | | | 1.89 | .06 |
| 54 | Polytex AquaSafe + 10% Xama 7 Magenta | | | 4.29 | .04 |
| 55 | Polytex AquaSafe + 10% Xama 7 Magenta | | | 4.22 | .09 |
| 56 | Polytex AquaSafe + 10% Xama 7 Cyan Created | 4.03 | .08 | 3.66 | .10 |
| 57 | Polytex AquaSafe + 5% Xama 7 Cyan | 3.31 | .30 | 2.66 | .42 |
| 58 | Polytex AquaSafe + 1% Xama 7 Cyan | 2.18 | .07 | 1.28 | .07 |
| 59 | Polytex AquaSafe + 10% Xama 7 Cyan (no pH adjustment) | | | 2.39 | .22 |
| 60 | Polytex AquaSafe + 10% Xama 7 Cyan (pH 9.5) | | | 2.16 | .08 |
| 61 | Polytex AquaSafe + 10% Xama 7 Cyan (pH 10.5) | | | 2.34 | .06 |
| 62 | Polytex AquaSafe + 10% Xama 7 Cyan (pH 11.13) | | | 2.68 | .19 |

As shown, adding Xama 7 to the flexographic ink compositions can increase the crockfastness of the dried ink compositions, particularly those solvent-based ink compositions.

Also, the inks of samples 57-62 were not the commercially available inks sold under the name AquaSafe, but rather a different ink composition provided directly from Polytex.

Example 2

Ink Jet Ink Compositions

The oil crockfastness of different ink jet ink compositions were tested. The samples were each prepared by printing the ink jet ink composition onto the exposed surface of a spunbond nonwoven web of polypropylene fibers. The web was provided as the exposed surface of a laminate of the spunbond nonwoven web and a liquid impermeable polypropylene film. After drying, each of the samples was tested to determine the oil crockfastness of the sample, as shown in Table 2:

TABLE 2

| Sample No. | Sample discription | Dry Avg | Dry Stdev | Wet Avg | Wet Stdev | Baby Oil Avg | Baby Oil Stdev |
|---|---|---|---|---|---|---|---|
| | InkWin Spring LC is solvent based ink | | | | | | |
| 1 | Inkwin Spring LC (pH 6.21) | 4.62 | 0.02 | 3.47 | 0.14 | 2.61 | 0.17 |
| 2 | Inkwin Spring LC + 10% Xama 7 (pH 10.5) | 4.21 | 0.14 | 3.06 | 0.03 | 3.63 | 0.11 |
| 3 | Inkwin Spring LC + 5% Xama 7 (pH 9.5) | 4.65 | 0.11 | 4.12 | 0.17 | 3.75 | 0.19 |
| 4 | Inkwin Spring LC + 2% Xama 7 | 4.72 | 0.07 | 4.69 | 0.01 | 4.33 | 0.07 |
| | Kodak Versamark is water based ink | | | | | | |
| 5 | Kodak Versamark 8605 Violet 2655 (pH 9.5) | 1.71 | 0.30 | 0.27 | 0.04 | 2.63 | 0.11 |
| 6 | KV 8605 Violet 2655 + 2.5% Kymene 450 (0.5% solids) | 2.34 | 0.02 | 1.01 | 0.12 | 2.40 | 0.31 |
| 7 | KV 8605 Violet 2655 + 10% Kymene 450 (2% solids) (pH 7.93) | 3.99 | 0.11 | 0.57 | 0.02 | 3.38 | 0.13 |
| 8 | KV 8605 Violet 2655 + 10% Xama 7 (pH 10) | 4.84 | 0.01 | 3.55 | 0.15 | 4.58 | 0.03 |
| 9 | KV 8605 Violet 2655 + 7% Xama 7 (pH 9.5) | 4.85 | 0.02 | 4.40 | 0.17 | 4.46 | 0.03 |
| 10 | KV 8605 Violet 2655 + 5% Xama 7 (pH 9.5) | 4.90 | 0.02 | 4.17 | 0.04 | 4.29 | 0.00 |
| 11 | KV 8605 Violet 2655 + 2% Xama 7 (pH 9.5) | 4.75 | 0.08 | 2.31 | 0.26 | 3.94 | 0.11 |
| 12 | KV 8605 Violet 2655 + 10% Carboset 514H + 2% Xama 7 (pH 8) | 4.85 | 0.01 | 4.29 | 0.04 | 4.41 | 0.01 |
| 13 | KV 8605 Violet 2655 + 10% Carboset 514 H | 4.86 | 0.02 | 0.77 | 0.00 | 4.21 | 0.01 |
| 14 | KV 8605 Violet 2655 + 10% Carboset 514H + 2% Xama 7 (pH 9.5) | 4.63 | 0.03 | 3.66 | 0.06 | 4.25 | 0.06 |
| 15 | KV 8605 Violet 2655 + 5% Carboset 514H + 2% Xama 7 (pH 8.24) | 4.53 | 0.12 | 2.40 | 0.14 | 3.87 | 0.02 |
| 16 | KV 8605 Violet 2655 + 10% Carboset 514H + 1% Xama 7 (pH 7.91) | 4.62 | 0.01 | 3.50 | 0.03 | 4.04 | 0.09 |
| 17 | KV 8605 Violet 2655 + 20% Carboset 514H + 4% Xama 7 (new lot) | 4.83 | 0.01 | 4.35 | 0.02 | 4.30 | 0.06 |
| 18 | KV 8605 Violet 2655 + 10% Carboset 514H + 2% Xama 7 (new lot) | 4.75 | 0.02 | 3.99 | 0.19 | 4.14 | 0.04 |
| 19 | KV 8605 Violet 2655 + 10% Carboset 510 + 2% Xama 7 | 4.73 | 0.06 | 3.76 | 0.07 | 4.23 | 0.13 |
| 20 | KV 8605 Violet 2655 + 10% Carboset 519 + 2% Xama 7 | 4.70 | 0.16 | 3.50 | 0.15 | 4.13 | 0.02 |
| 21 | KV 8605 Violet 2655 + 10% Carboset 511 + 2% Xama 7 | 4.71 | 0.05 | 3.32 | 0.04 | 4.11 | 0.06 |
| | Home made waterbased inks | | | | | | |
| 22 | Orcoacid Dye Control | 1.45 | 0.13 | 0.21 | 0.01 | 0.88 | 0.32 |
| 23 | OrcoacidSaphire Dye-2%, 2% Xama-7 10% Carboset 514H | 4.78 | 0.12 | 4.2 | 0.04 | 4.59 | 0.03 |
| 24 | Orcoacid Rubin Dye-2%, 2% Xama-7, 10% Carboset 514H | 4.8 | 0.02 | 3.66 | 0.03 | 4.17 | 0 |

As shown, the addition of Xama 7 to the ink jet ink compositions can increase the crockfastness of the dried ink compositions. Additionally, the combination of Xama 7 and a colloidal acrylic dispersion (e.g., Carboset) can increase the crockfastness of the dried ink compositions.

These and other modifications and variations to the present invention may be practiced by those of ordinary skill in the art, without departing from the spirit and scope of the present invention, which is more particularly set forth in the appended claims. In addition, it should be understood the aspects of the various embodiments may be interchanged either in whole or in part. Furthermore, those of ordinary skill in the art will appreciate that the foregoing description is by way of example only, and is not intended to limit the invention so further described in the appended claims.

The invention claimed is:

1. A method of printing on a visible surface of a nonwoven web of synthetic fibers, the method comprising:

providing an ink composition comprising a fugitive alkali, an adhesion promoter, and a crosslinking agent in an amount of about 5% by weight to about 20% by weight based on the wet weight of the ink composition, wherein the ink composition has a pH kept above 8 by the fugitive alkali, and wherein the crosslinking agent comprises an aziridine oligomer with at least two aziridine functional groups; and ink jet printing the ink composition on the visible surface of the nonwoven web, wherein upon printing the ink composition, the fugitive alkali evaporates to decrease the pH of the printed ink composition to trigger the action of the crosslinking agent, and wherein upon drying the ink composition comprises greater than about 25% by weight of the crosslinking agent based on the dried weight of the ink composition and about 10% to about 50% by weight of the adhesion promoter based on the dried weight of the ink composition.

2. The method as in claim 1, wherein the crosslinking agent is present in the ink composition from about 7% by weight to about 15% by weight based on the wet weight of the ink composition.

3. The method as in claim 1, wherein the crosslinking agent is present in the ink composition from about 10% by weight to about 12% by weight based on the wet weight of the ink composition.

4. The method as in claim 1, wherein the fugitive alkali comprises ammonia.

5. The method as in claim 1, wherein the adhesion promoter comprises an acrylic colloidal dispersion polymer.

6. The method as in claim 1, wherein the ink composition further comprises a coloring agent.

7. The method as in claim 1, wherein the nonwoven web of synthetic fibers comprises a spunbond web of polypropylene fibers.

8. The method as in claim 1, wherein the nonwoven web is laminated to a breathable film.

9. The method as in claim 1 further comprising
functionalizing the visible surface of the nonwoven web via Corona treatment applied at a level of about 2-50 watt-minutes per square foot of web.

10. The method as in claim 1, wherein printing the ink composition includes heating the ink composition to a curing temperature.

11. The method as in claim 10, wherein the curing temperature is below the melting temperature of the nonwoven web.

12. The method as in claim 1, wherein upon drying the ink composition comprises about 25% by weight to about 50% by weight of the crosslinking agent based on the dried weight of the ink composition.

13. The method as in claim 1, wherein upon drying the ink composition comprises greater than about 50% by weight of the crosslinking agent based on the dried weight of the ink composition.

14. The method as in claim 1, wherein upon drying the ink composition comprises about 40% by weight to about 80% by weight of the crosslinking agent based on the dried weight of the ink composition.

15. The method as in claim 1, wherein upon drying the ink composition comprises about 50% by weight to about 70% by weight of the crosslinking agent based on the dried weight of the ink composition.

16. The method as in claim 1, wherein the ink composition has a viscosity of about 0 cP to about 50 cP at about 20° C.

17. The method of claim 16, wherein the ink composition is sprayed onto the visible surface of the nonwoven web.

* * * * *